United States Patent
Bang

[19]

[11] Patent Number: 5,942,861
[45] Date of Patent: Aug. 24, 1999

[54] FRONT/BACK PORCH VOLTAGE-REGULATOR OF VERTICAL FOCUS CONTROL SIGNAL

[75] Inventor: Jeong Ho Bang, Suwon, Rep. of Korea

[73] Assignee: SamSung Electronics Co., Ltd., Kyungki, Rep. of Korea

[21] Appl. No.: 08/880,673

[22] Filed: Jun. 23, 1997

[30] Foreign Application Priority Data

Jun. 21, 1996 [KR] Rep. of Korea ................... 96-22947

[51] Int. Cl.$^6$ ................... G09G 1/00; H04N 3/26
[52] U.S. Cl. ............... 315/382; 315/382.1; 348/806
[58] Field of Search ................... 315/382, 382.1, 315/368.22; 348/806

[56] References Cited

U.S. PATENT DOCUMENTS

| | | | |
|---|---|---|---|
| 3,821,592 | 6/1974 | Siegel | 315/382.1 |
| 4,514,634 | 4/1985 | Lawson | 250/397 |
| 4,555,649 | 11/1985 | Sharma | 315/382 |
| 5,512,964 | 4/1996 | Kim | 348/806 |
| 5,780,978 | 7/1998 | Bang | 315/382.1 |

FOREIGN PATENT DOCUMENTS 1100151  1/1968  United Kingdom ................... 315/382

*Primary Examiner*—Edward P. Westin
*Assistant Examiner*—Shane R. Gardner
*Attorney, Agent, or Firm*—Robert E. Bushnell, Esq.

[57] ABSTRACT

A voltage control circuit to control a focus exactly by controlling a front/back porch voltage level of a vertical focus control signal regardless of a slight error in an upper and a lower part of a cathode-ray tube. In order to control the front/back porch level of the vertical focus control signal, a certain level of a DC voltage put out by a level controller is added to a saw tooth wave generated by integrating a DC voltage put out by a microcomputer in a first integrator. In a second integrator, a parabola wave is generated by secondly integrating the DC voltage. The level of the DC voltage added to the saw tooth wave is controlled by putting out the generated parabola wave as the vertical focus control signal according to a slight error generated in the upper and the lower part of a cathode-ray tube, and this enables to control the front/back porch voltage level of the vertical focus control signal and the focus exactly in the upper and the lower part of the screen.

14 Claims, 5 Drawing Sheets

FRONT/BACK PORCH VOLTAGE-REGULATOR OF VERTICAL FOCUS CONTROL SIGNAL

This application makes reference to, incorporates the same herein, and claims all benefits accruing under 35 U.S.C §119 from an application entitled Front/Back Porch Voltage-Regulator Of Vertical Focus Control Signal earlier filed in the Korean Industrial Property Office on Jun. 21, 1996, and there duly assigned Ser. No. 96-22947 by that Office.

BACKGROUND OF THE INVENTION

1. Field of the Invention

This invention relates generally to a front/back porch voltage-regulator varying a front/back porch voltage level of a vertical focus control signal in the displayer such as televisions or monitors using a cathode-ray tube as a displaying equipment.

2. Description of the Prior Art

A cathode-ray tube is generally composed of an electron gun generating a red, green and blue electron beam at a back neck, a shadow mask and, in front, red, green and blue phosphor for emitting red, green and blue light when struck by the beam for expressing a certain image. The red, green, and blue electron beam generated by the electron gun pass through an electron beam passing hole before colliding with the red, green and blue phosphor. Accordingly, the image can only be expressed exactly and clearly when the red, green and blue electron beam generated by the electron gun collides exactly with the red, green and blue phosphor. Therefore, a focus electrode must be equipped to regulate the focus of the electron beam generated by the electron gun, and a certain focus regulating signal must be applied to the focus electrode.

The focus electrode generates a certain electric field according to the applied level of the focus regulating signal, and regulates the focus by regulating the width of the electron beam according to the intensity of the generated electric field. Since the distance from the electron gun to the middle, the upper, lower, left and right portions of the screen differ from each other, the level of the focus regulating signal must be varied according to the colliding position of the electron beam to the phosphor, that is the deflected position. As a result, a display using a cathode-ray tube as a displaying equipment generates horizontal and vertical focus regulating signals according to the frequency of the horizontal and vertical synchronous signals.

U.S. Pat. No. 4,555,649 to Gulab Sharma and entitled Cathode Ray Tube Focusing Circuitry, contemplates focus control by taking a sawtooth wave signal from a vertical deflection circuit and integrating it in an operational amplifier to produce a parabolic wave signal which is applied to the inverting input of a second operational amplifier. The inverted parabolic wave signal is then added to another parabolic wave signal applied to the other input of the second operational amplifier, which was produced by a S-correction capacitor of a horizontal deflection circuit, to produce a parabolic signal envelope. The parabolic signal envelope is then inverted, amplified and applied as a dynamic focus signal to the focus electrode of the cathode ray tube to modulate the focus electrode's static voltage.

U.S. Pat. No. 5,512,964 to Kang H. Kim entitled Dynamic Focusing Circuit Having A Psuedo Horizontal Output Circuit To Eliminate Phase Deviation In A Focus Signal contemplates enhancing the correctness of the focus by use of a plurality of variable resistors which can control the amplitude of the vertical and horizontal components of the dynamic focus signal, the DC level of the dynamic focus signal, and the phase deviation between the horizontal deflection component and the horizontal component of the dynamic focus signal.

SUMMARY OF THE INVENTION

The present invention differs from the dynamic focus circuits of the prior art in which vertical and horizontal focusing components are combined in an envelope signal. The purpose of this invention is to provide a front/back porch voltage control circuit of a vertical focus control signal which can control the focus exactly in an upper and a lower part of the screen even if a slight error happens in the upper and the lower part of the screen.

In order to achieve this purpose, the invention is equipped with a level control circuit for controlling a DC voltage of the front and the back porch of the vertical focus control signal. The front/back porch voltage level of the vertical focus control signal is is controlled by utilizing an operational amplifier to integrate a DC voltage from a microcomputer for producing a saw tooth wave. A DC voltage having a certain level manipulated by an operator is appended to the saw tooth wave to produce a modified wave. Then the modified wave is then integrated to form a parabolic wave. The parabolic wave is then buffered and amplified in order to output a vertical focus control signal.

Therefore the focus can be controlled exactly by controlling the front/back porch voltage level of the vertical focus control signal even if a slight error happens in the upper and the lower position of the screen.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same components, wherein.

DETAILED DESCRIPTION OF A PREFERRED EMBODIMENT

Figure 1:
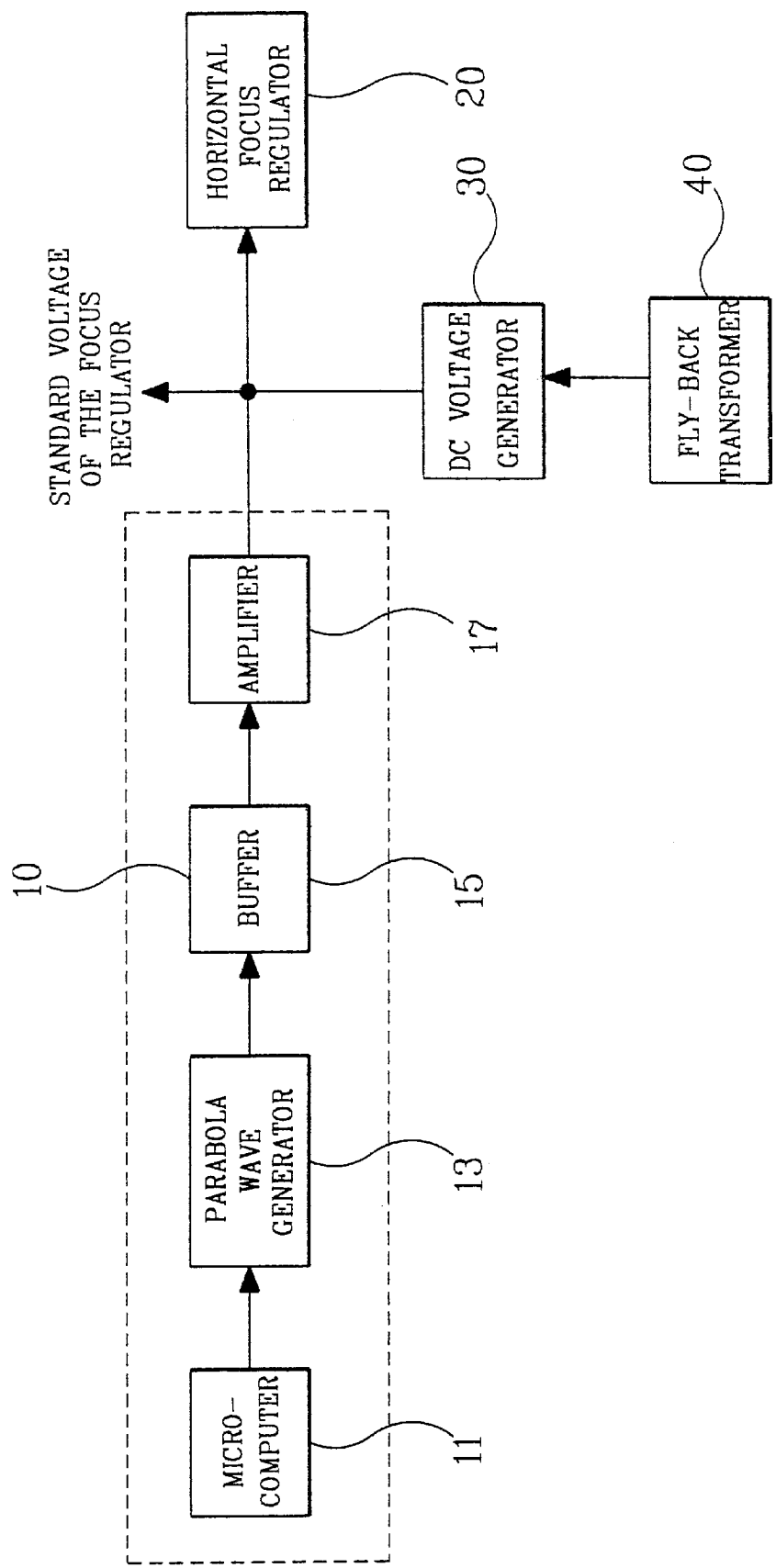
FIG. 1 illustrates an example of an ideal focus control circuit in block diagram form.

FIG. 1 generally depicts, in block diagram form, an exemplary focus regulating circuit utilizing a vertical focus regulator 10 for generating a vertical focus regulating signal, a horizontal focus regulator 20 for generating a horizontal focus regulating signal, a DC voltage generator 30 which rectifies and smooths the output voltage of a fly-back transformer 40 and transforms it to a DC voltage for output as a standard focus regulation voltage.

Figure 3A:
FIGS. 3A through 3E are wave form diagrams illustrating signals at various points in the vertical focus regulator of FIG. 2.

Vertical focus regulator 10 is composed of a microcomputer 11 for generating a DC voltage, shown in FIG. 3A, of a level according to the frequency of the vertical synchronizing signal, a parabola wave generator 13 for converting the DC voltage output from microcomputer 11 to a parabolic wave, a buffer 15 for buffering and amplifying the parabolic wave and an amplifier 17 for outputting a vertical focus regulating signal by amplifying the output signal of buffer 15.

Figure 2:
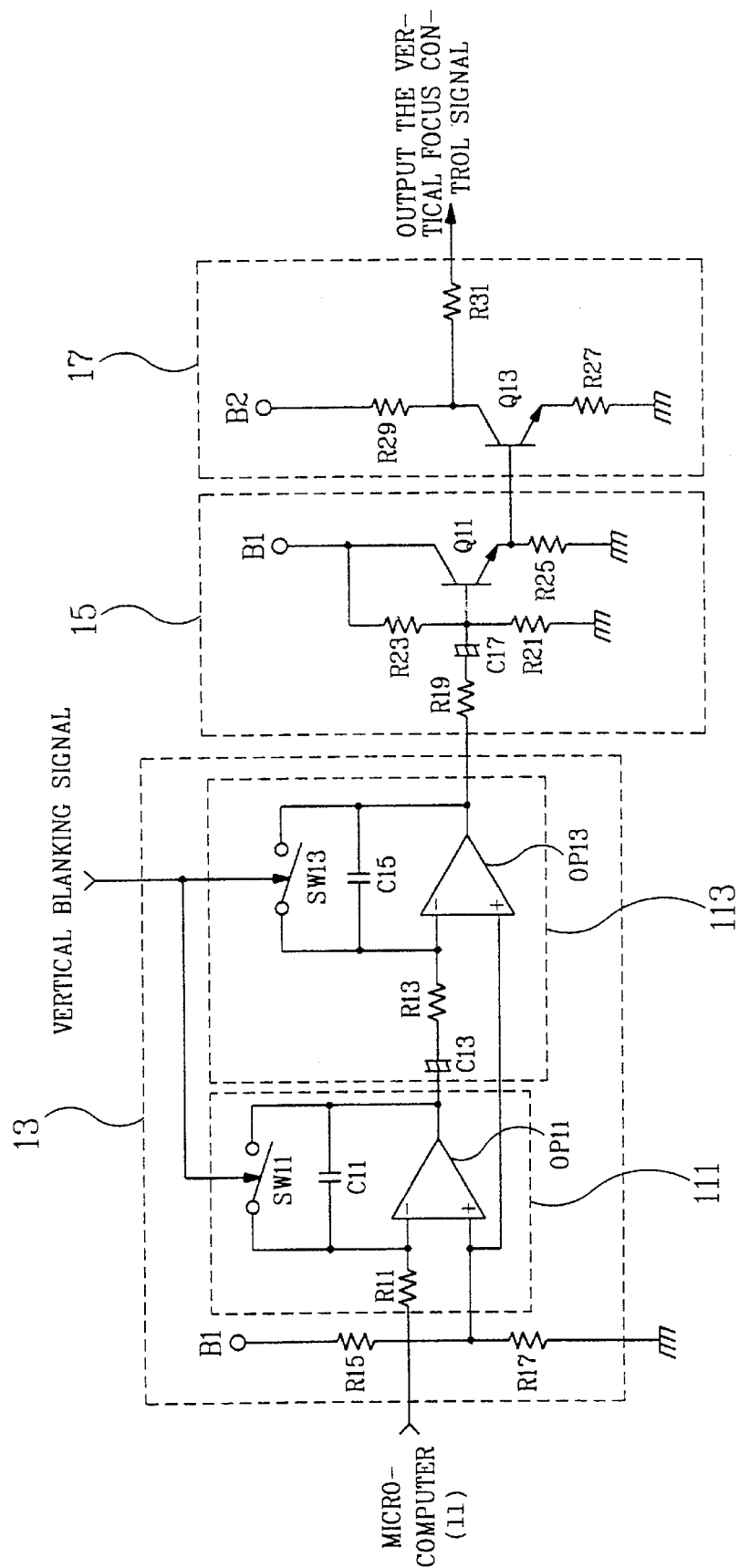
FIG. 2 is a detailed diagram of the vertical focus regulator of the focus control circuit of FIG. 1.
Figure 3B:
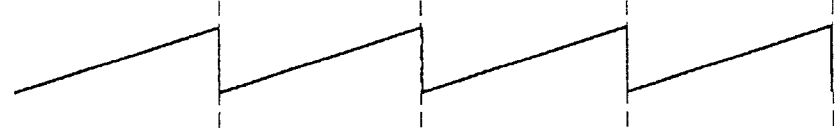

As depicted in FIG. 2, the output terminal of microcomputer 11 is connected to an input of parabola wave generator 13 which is connected to an inverting input terminal of an operational amplifier OP11 through a resistor R11. Connected between the inverting input terminal and an output terminal of operational amplifier OP11 is a switching device SW11 in parallel with a capacitor C11, wherein switching device SW11 is responsive to a vertical blanking signal. The noninverting input terminal of operational amplifier OP11 is connected to a node connecting resistor R15 to resistor R17, wherein resistors R15 and R17 are connected in series between a power supply B1 and a ground terminal. Accordingly, operational amplifier OP11 forms a portion of an integrator 111 for generating a saw tooth wave as shown in FIG. 3B.

Figure 3C:

The output terminal of integrator 111 is connected to an inverting input terminal of an operational amplifier OP13 through a series connected capacitor C13 and resistor R13. A noninverting input terminal of operational amplifier OP13 is connected to the node between resistors R15 and R17. Connected between the inverting input terminal and an output terminal of operational amplifier OP13 is a switching device SW13 in parallel with a capacitor C15, wherein switching device SW15 is responsive to to vertical blanking signal. Accordingly, operational amplifier OP13 forms a portion of an integrator 113 for generating a parabolic wave, as shown in FIG. 3C, by integrating the saw tooth wave signal output by integrator 111.

Figure 3D:
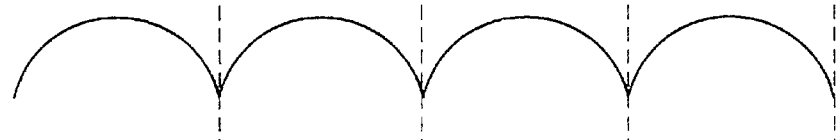

The parabolic wave output from integrator 113 is supplied to buffer 15, and more particularly, through serially connected resistor R19 and capacitor C17 to a base of a transistor Q11. Power supply terminal B1 is connected to the base through a resistor R23 and is also directly connected to the collector of transistor Q11 A resistor R21 is connected between the base of transistor Q11 and the ground terminal, and a resistor R25 is connected between the emitter of transistor Q11 and the ground terminal. The output of buffer 15 supplied by the emitter of transistor Q11 is shown in FIG. 3D.

Amplifier 17 is composed of a transistor Q13 having a base connected to the emitter of transistor Q11, a collector connected to a power supply B2 through a resistor R29 and an emitter connected to the ground terminal through a resistor R27. The collector of transistor Q13 provides a vertical focus control signal to an output terminal of amplifier 17 through a resistor R31.

In the circuit described above, the DC voltage of the saw tooth wave generated by integrator 111 is removed by capacitor C13 before being input to the noninveting input terminal of operational amplifier OP13 through resistor R13.

Additionally, the parabolic wave generated by parabola wave generator 13 is supplied through resistor R19 of buffer 15 and applied to the base of the transistor Q11 after the DC level has been removed by capacitor C17.

Also, the role of transistor Q11 is as an emitter-follower to prevent the distortion of the damage like current shortage when the parabolic wave is applied to the base of transistor Q13 of amplifier 17. That is, when transistor Q13 of amplifier 17 amplifies the parabolic wave, if the current for amplifying is short, it does not amplify the parabolic wave normally, thus, the parabolic wave flows backwards toward parabolic wave generator 13. Since transistor Q11 is connected as an emitter-follower the parabolic wave is prevented from flowing backwards and affecting parabolic wave generator 13.

Figure 3E:
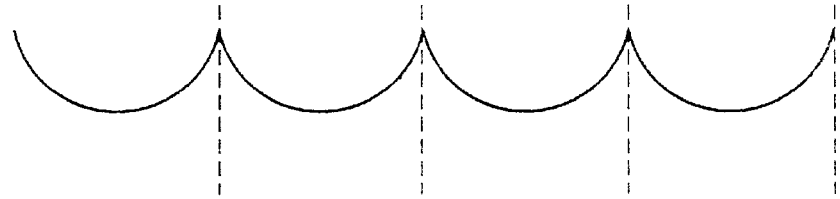

Further, transistor Q13 amplifies the output signal, FIG. 3D, of buffer 15, and inverts it to generate the vertical focus control signal as depicted in FIG. 3E.

Referring again to FIG. 1, the vertical focus control signal output by amplifier 17 of vertical focus regulator 10 is added to the horizontal focus control signal output by horizontal focus regulator 20 and the output voltage of DC voltage generator 30 to form a focus control signal to be applied to the focus electrode of the electron gun for controlling the focus of the electron beam.

Since focus control circuit described above controls the level of the DC voltage output by microcomputer 11 and maintains the gain of the vertical focus control signal according to the frequency of the vertical synchronous signal, an ideal dynamic focus control can be realized. For example, if the frequency of the vertical synchronous signal is 60 Hz, microcomputer 11 outputs a DC voltage signal of 10V to maintain the gain of the vertical focus control signal at 200V. If the frequency of the vertical synchronous signal is 75 Hz, microcomputer 11 outputs a DC voltage signal of 7V to maintain the gain of the vertical focus control signal at 200V. If the frequency of the vertical synchronous signal is 120 Hz, microcomputer 11 outputs a DC voltage signal of 2V to maintain the gain of the vertical focus control signal at 200V. Therefore, even the slightest error can not happen in the production of an ideal cathode-ray tube, and if assembled precisely, the focus can be controlled throughout the whole screen, and a certain image can be expressed clearly and exactly. But in producing a real cathode-ray tube, a slight error occurs in the upper or lower part of the screen. Therefore it is almost impossible to handle the exact focus control in the upper or the lower part of the screen even if the vertical focus control signal is generated precisely, and as a result of that, the image can not be expressed clearly and exactly.

A front/back porch voltage control circuit of a vertical focus regulator according to the invention for overcoming the problem of the circuit of FIG. 1 will be described in detail with reference to FIGS. 4 and 5A–5E.

Figure 4:
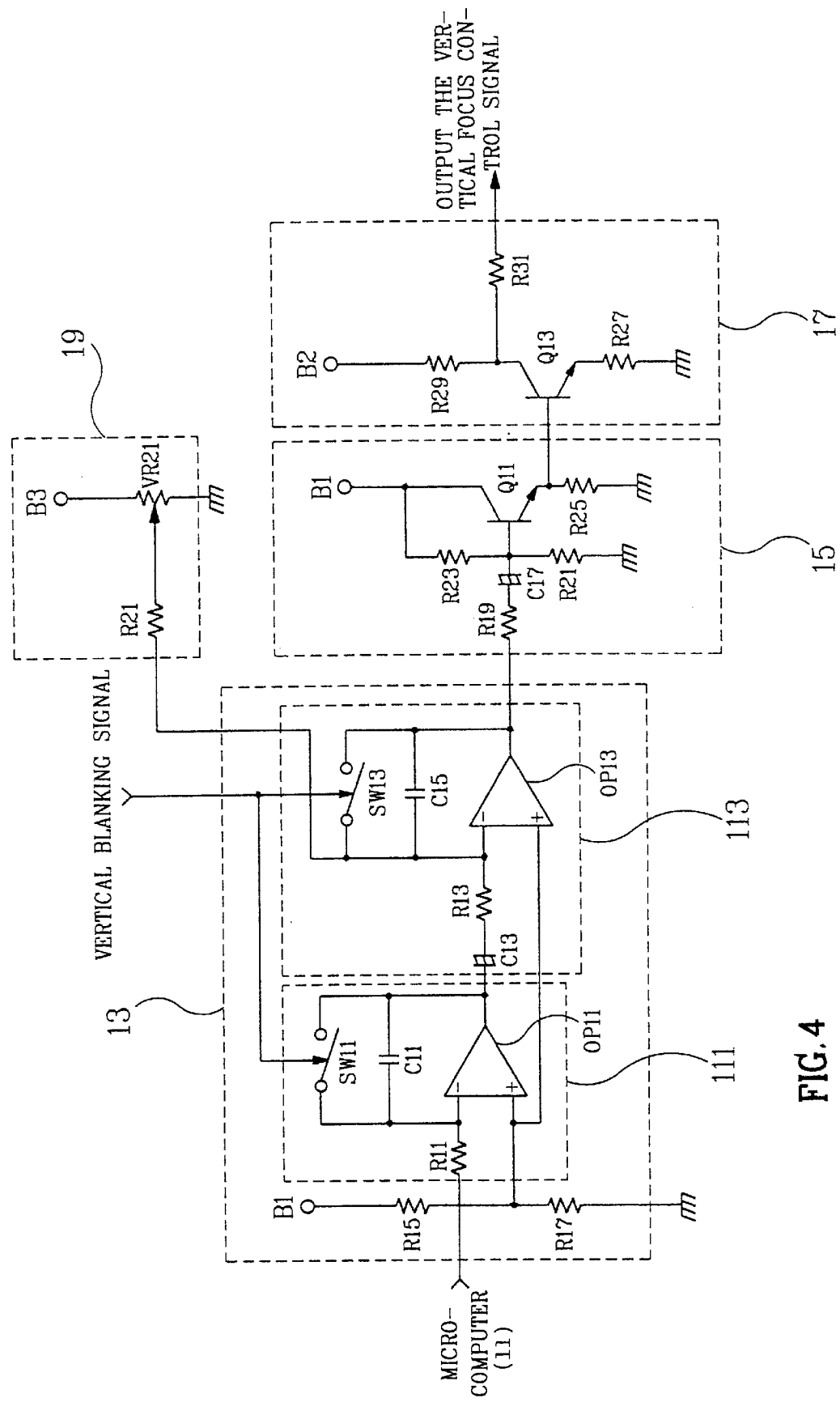
FIG. 4 is a detailed diagram of the vertical focus regulator of a focus control circuit according to the principles of the present invention.

FIG. 4 generally depicts a detailed circuit diagram of a focus control circuit equipped with a control circuit of this invention. As shown in FIG. 4, the focus control circuit is generally the same as the circuit shown in FIG. 2 except for the addition of a level control circuit 19 as described below.

Level control circuit 19 is equipped to add a DC voltage to the saw tooth signal provided from resistor R13 to the inverting input terminal of operational amplifier OP13. Level control circuit 19 is composed of a variable resistor VR21 connected between a power supply terminal B3 and the ground terminal. Variable resistor VR21 variably divides the voltage of power supply terminal B3 according to a manipulation by an operator. Variable resistor VR21 provides a divided DC voltage through a resistor R21 to the inverting input terminal of operational amplifier OP13 thereby appending a DC voltage to the saw tooth wave signal applied to the inverting input terminal of operational amplifier OP13.

Figure 5:
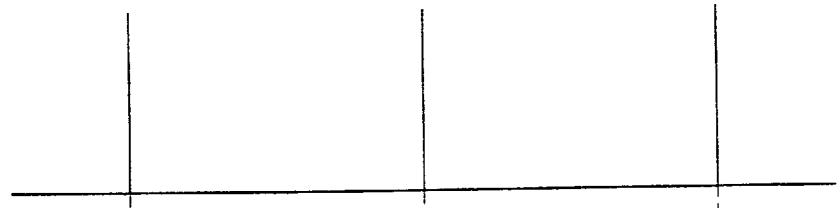
FIGS. 5A through 5D are wave form diagrams illustrating signals at various points in the vertical focus controller of FIG. 4.
Figure 5:
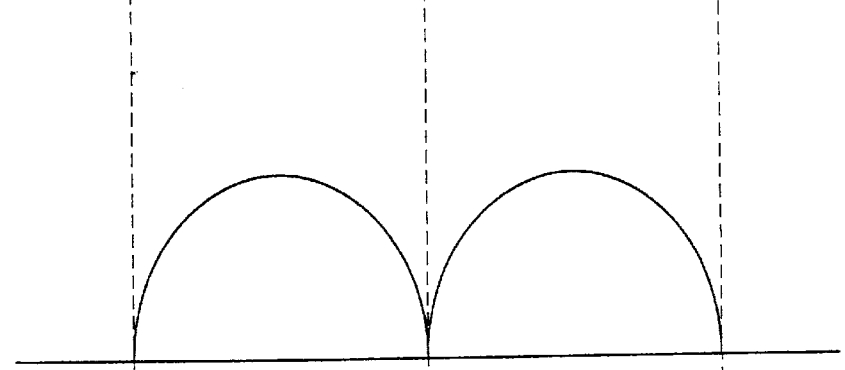
Figure 5:
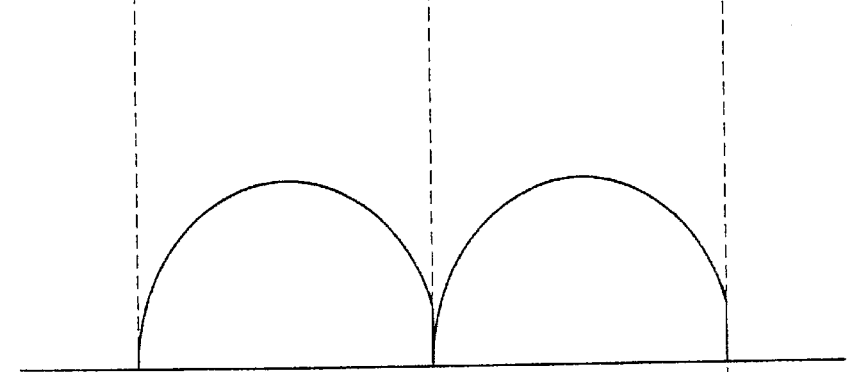
Figure 5:
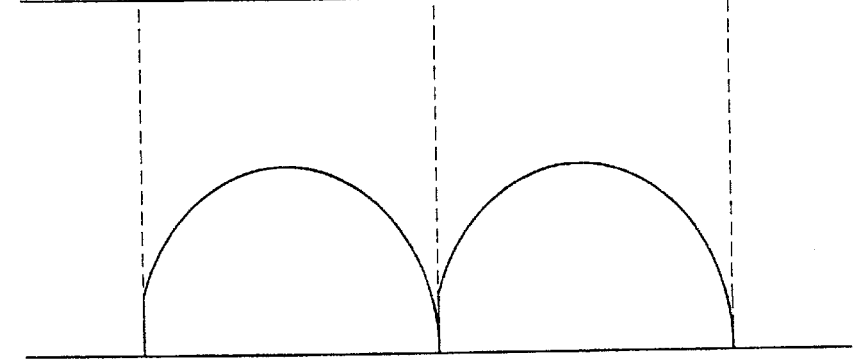

A DC voltage, as shown in FIG. 5A, from the microcomputer 11, according to a frequency of the vertical synchronous signal, is integrated by integrator 111 to output a saw tooth wave with a frequency of a vertical blanking signal. The user manipulates variable resistor VR21 of level control circuit 19 so that it outputs only a reference voltage when a slight error in the upper or lower portions of a cathode-ray tube are not noticeable. The reference voltage output by variable resistor VR21 is supplied through resistor R21 and appended to the saw tooth wave output by integrator 111. Therefore, as depicted in FIG. 5B, integrator 113 generates parabolic waves with the same front/back porch voltage level. The generated parabolic wave is output as a vertical focus control signal through the buffer 15 and the amplifier 17, and controls the focus regardless of any error in the upper and the lower part of the cathode-ray tube.

When the user notices a slight error in the upper or lower portions of the cathode-ray tube, variable resistor VR21 is manipulated to control the front/back porch voltage level of the parabolic wave. When the voltage level of the back porch must be higher than that of the front porch of the parabolic wave, variable resistor VR21 is varied so that the DC voltage level output by level control circuit 19 is lower than the above mentioned reference voltage. Then the low DC voltage is added to the saw tooth wave and then integrated in integrator 113. Accordingly, the output voltage level of the back porch is higher than that of the front porch and a parabolic wave as depicted in FIG. 5C is output by integrator 113.

When the user determines that the voltage level of the back porch must be lower than that of the front porch of the parabolic wave, variable resistor VR21 is varied by the user so that the DC voltage level output by level control circuit 19 is higher than the above mentioned reference voltage. When a high DC voltage is added to the saw tooth wave, the resulting voltage level of the back porch of the parabolic wave is lower than that of the front porch and a parabolic wave as depicted in FIG. 5D is output by integrator 113.

Thus, the focus can be controlled exactly regardless of the slight error in the upper and the lower position of the cathode-ray tube according to the control of the front/back porch voltage level of the parabola wave produced as a vertical focus control signal.

An image is expressed clearly and exactly by controlling the focus even if there is a slight error in the upper and the lower position in producing the cathode-ray tube as the front/back porch voltage level of the parabola wave output as the vertical focus control signal is controlled to be generated differently.

What we claim is:

1. A front/back porch voltage control circuit for generating a vertical focus control signal, comprising:
   a first integrator for generating a saw tooth signal by integrating a first DC voltage output by a microcomputer according to a frequency of a vertical synchronous signal;
   a second integrator generating a parabolic wave by integrating said saw tooth signal;
   a level control means for adding a second DC voltage to said saw tooth signal prior to integration by said second integrator to control a front/back porch voltage level of said parabolic wave;
   a buffer for buffering and amplifying said parabolic wave; and
   an amplifier for outputting said vertical focus control signal by inverting and amplifying an output signal of said buffer.

2. The circuit as set forth in claim 1, wherein said level control means comprises:
   a variable resistor for generating said second DC voltage by dividing a voltage supplied by a power source; and
   adding means for appending said second DC voltage to said saw tooth signal.

3. The circuit as set forth in claim 2, wherein said adding means is a resistor.

4. A front/back porch voltage control circuit for generating a vertical focus control signal, comprising:
   a microcomputer for generating a first DC voltage signal according to a frequency of a vertical synchronizing signal;
   level control means for generating a second DC voltage signal;
   parabolic wave generating means for generating a parabolic wave by integrating a modified saw tooth signal formed by appending said second DC voltage signal to a saw tooth signal generated by integrating said first DC voltage signal;
   a buffer for buffering and amplifying said parabolic wave; and
   an amplifier for outputting said vertical focus control signal by inverting and amplifying an output signal of said buffer.

5. The circuit as set forth in claim 4, wherein said level control means comprises:
   a first resistor connected between a power source and a ground terminal, wherein said first resistor is variable; and
   a second resistor connected between said first resistor and said parabolic wave generating means for appending said second DC voltage signal to said saw tooth signal.

6. The circuit as set forth in claim 4, wherein said parabolic wave generating means comprises:
   a first resistor connected between a first power source and a first node;
   a second resistor connected between said first node and a ground terminal, wherein said first and second resistors divide a voltage of said first power source to provide a divided voltage at said first node;
   a first integrator for generating said saw tooth signal, comprising:
      an operational amplifier having an inverting input terminal for receiving said first DC voltage signal, a noninverting input terminal connected to said first node for receiving said divided voltage, and an output terminal for outputting said saw tooth signal;
      a third resistor for providing said first DC voltage signal from said microcomputer to said inverting input terminal;
      a first capacitor connected between said inverting input terminal and said output terminal; and
      a first switch, responsive to a vertical blanking signal, coupled in parallel with said first capacitor;
   a second integrator for generating said parabolic wave, comprising:
      a second capacitor connected to said output terminal of said operational amplifier for removing a DC voltage component from said saw tooth signal;
      a fourth resistor connected between said second capacitor and a second node, said second node being connected to receive said second DC voltage signal from said level control means, said modified saw tooth signal being formed at said second node;
      a second operational amplifier having a second inverting input terminal connected to said second node for receiving said modified saw tooth signal, a second noninverting input terminal connected to said first node for receiving said divided voltage, and a second output terminal for outputting said parabolic wave;

a third capacitor connected between said second inverting input terminal and said second output terminal; and a second switch, responsive to said vertical blanking signal, coupled in parallel with said third capacitor.

7. The circuit as set forth in claim 6, wherein said level control means comprises:

a variable resistor connected between a second power source and a ground terminal; and a fifth resistor connected between said variable resistor and said second node for appending said second DC voltage signal to said saw tooth signal.

8. The circuit as set forth in claim 6, wherein said buffer comprises:

a fifth resistor connected to said second output terminal;

a fourth capacitor connected between said fifth resistor and a third node;

a sixth resistor connected between said third node and said ground terminal;

a transistor having a base connected to said third node, a collector connected to said first power source and an emitter connected to said ground terminal through a seventh resistor, said emitter providing said output signal of said buffer; and an eighth resistor connected between said collector and said base.

9. The circuit as set forth in claim 8, wherein said amplifier comprises:

a second transistor having a second base connected to said emitter, a second emitter connected to said ground terminal through a ninth resistor, and a second collector connected to a second power source through an eleventh resistor; and a twelfth resistor connected to said second collector for outputting said vertical focus control signal.

10. A method for controlling a front/back porch voltage of a vertical focus control signal, comprising the steps of:

generating a first DC voltage signal according to a frequency of a vertical sync signal;

converting said first DC voltage signal into a saw tooth signal;

generating a second DC voltage signal by user manipulation of a variable resistor connected between a power source and a ground terminal;

adding said second DC voltage signal to said saw tooth signal to form a modified saw tooth signal;

converting said modified saw tooth signal into a parabolic wave; and amplifying and inverting said parabolic wave to generate said vertical focus control signal.

11. The method as set forth in claim 10, wherein said step of converting said first DC voltage signal into a saw tooth signal comprises a step of integrating said first DC voltage signal.

12. The method as set forth in claim 10, wherein said step of converting said modified saw tooth signal comprises a step of integrating said modified saw tooth signal.

13. The method as set forth in claim 10, further comprising the steps of:

manipulating said variable resistor to generate a third DC voltage signal having a voltage level lower than a level of said second DC voltage signal; and appending said third DC voltage signal, instead of said second DC voltage signal, to said saw tooth signal in order to modify said front porch voltage of said vertical focus control signal.

14. The method as set forth in claim 10, further comprising the steps of:

manipulating said variable resistor to generate a third DC voltage signal having a voltage level higher than a level of said second DC voltage signal; and appending said third DC voltage signal, instead of said second DC voltage signal, to said saw tooth signal in order to modify said back porch voltage of said vertical focus control signal.

* * * * *